(12) United States Patent
Olson

(10) Patent No.: US 7,365,745 B2
(45) Date of Patent: Apr. 29, 2008

(54) METHOD OF RENDERING A SURFACE FROM A SOLID GRAPHICAL IMAGE

(75) Inventor: Eric S. Olson, Maplewood, MN (US)

(73) Assignee: St. Jude Medical, Atrial Fibrillation Division, Inc., Maple Grove, MN (US)

( * ) Notice: Subject to any disclaimer, the term of this patent is extended or adjusted under 35 U.S.C. 154(b) by 198 days.

(21) Appl. No.: 11/227,005

(22) Filed: Sep. 15, 2005

(65) Prior Publication Data

US 2007/0057945 A1    Mar. 15, 2007

(51) Int. Cl.
*G06T 17/00*    (2006.01)

(52) U.S. Cl. .................... 345/424; 345/419; 345/426; 382/154; 382/225; 600/425; 600/439

(58) Field of Classification Search ................ 345/419, 345/424, 426; 382/225, 154; 600/425, 439
See application file for complete search history.

(56) References Cited

U.S. PATENT DOCUMENTS

| | | | |
|---|---|---|---|
| 4,785,399 A * | 11/1988 | Evans et al. ................ 715/810 |
| 5,275,164 A * | 1/1994 | Maeda et al. ............... 600/410 |
| 5,662,108 A | 9/1997 | Budd et al. | |
| 5,697,377 A | 12/1997 | Wittkampf | |
| 5,983,126 A | 11/1999 | Wittkampf | |
| 6,075,871 A * | 6/2000 | Simanovsky et al. ....... 382/100 |
| 6,728,562 B1 | 4/2004 | Budd et al. | |
| 2004/0254437 A1 | 12/2004 | Hauck et al. | |
| 2005/0203394 A1 | 9/2005 | Hauck | |

OTHER PUBLICATIONS

Barber, C.B., et. al., The Quickhull algorithm for convex hulls, ACM Trans. On Mathematical Software, 22(4):469-483 Dec. 1996.

* cited by examiner

*Primary Examiner*—Kimbinh T. Nguyen
(74) *Attorney, Agent, or Firm*—Heimbecher & Associates LLC; Wiley Rein LLP

(57) ABSTRACT

A method for transforming solid, three-dimensional image data into three-dimensional surface data first smoothes the surface of the solid image by removing extraneous voxels both attached to main surface of the solid image as well as extraneous voxels about the main image before the surface transformation. Once the solid image is transformed into a surface image, the method again cleans the surface by removing any significantly spiked structures that appear out of place when considered with respect to the surrounding topography. The amount of data required to render the surface image is reduced by removing surface facets that fall within a planar threshold of the surrounding topography. The topography is also compressed in local areas to bring the topography toward a median level. The method may further cycle to attempt to reduce additional surface facets that may fall now within the threshold limit.

20 Claims, 14 Drawing Sheets

METHOD OF RENDERING A SURFACE FROM A SOLID GRAPHICAL IMAGE

BACKGROUND OF THE INVENTION

1. Field of the Invention

This invention relates to methods for transforming solid graphical image files into data that represents merely the surface of the solid image.

2. Background Art

In conventional x-ray systems, a two dimensional shadow image is created based upon the different x-ray absorption characteristics of bone and soft tissues. A great improvement on the conventional x-ray system as a diagnostic tool was provided by the development of computed tomography (CT) or computerized axial tomography (CAT) systems. These CT or CAT systems are x-ray based and initially were used to produce single two dimensional views depicting transverse slices of a body, object, or patient being investigated. Three-dimensional information was thereafter assembled from CT scan data by generating data for a number of contiguous slices and using the inferential abilities of the radiologist to suggest a three dimensional representation for the various internal organs. Shaded and contoured three dimensional images can be generated by interpolation between slices from the three dimensional array of data generated by a sequence of such contiguous CT scans. In the same way, the newer magnetic resonance imaging (MRI) technology is also capable of generating three-dimensional arrays of data representing physical properties of interior bodily organs. MRI systems offer an advantage over CT systems by providing the capability to better discriminate between various tissue types, not just bone and soft tissue. MRI imaging systems are also capable of generating physiological data rather than just image data. Again, as in CT systems, MRI data is available only as a sequence of slices and interpolation between the slices is necessary to render a three dimensional image.

In recent years CT and MRI images of a patient's heart have been used to aid cardiologists and other clinicians in performing electrophysiology studies or cardiac ablation treatments to diagnose and treat arrhythmias. The three-dimensional images of the heart help the clinician visualize the location of a catheter electrode within the heart to map and treat a patient's condition. Generally, however, only a rendering of the surface of cavities within the heart is necessary or desirable. Therefore, methodologies have been developed to transform the solid, three-dimensional information from MRI or CT image data into surface data only. By manipulating only surface data, much less processing power is required and greater rendering speeds are achieved.

Several options for transforming solid, three-dimensional image data into mere surface data have previously been developed, each with benefits and drawbacks. Such positive and negative aspects generally manifest themselves in relative processing speeds, accuracy of the surface rendering, and ability to identify and discard extraneous information.

The information included in this Background section of the specification, including any references cited herein and any description or discussion thereof, is included for technical reference purposes only and is not to be regarded subject matter by which the scope of the invention is to be bound.

BRIEF SUMMARY OF THE INVENTION

The present invention provides a new methodology for transforming solid, three-dimensional image data into three-dimensional surface data. As part of the transformation, the method smoothes the surface of the solid image by removing extraneous voxels, including both voxels attached to the main surface of the solid image as well as extraneous voxels about the main image before the surface transformation. Once the solid image is transformed into a surface image, the method again cleans the surface by removing any severely spiked, peak-like structures that appear out of place when considered with respect to the surrounding topography. The method further reduces the amount of data required to render the surface image by removing surface facets that fall within a planar threshold of the surrounding topography. The method additionally compresses the topography in local areas to bring the topography toward a median level. After compressing topographical areas, the method may cycle to attempt to reduce additional surface facets that may fall now within the threshold limit. Once a target level of data reduction is reached the three-dimensional surface image is considered complete and saved for use. An exemplary application for this method is in transforming MRI or CT image data into three-dimensional surface-only data for use in conjunction with electrophysiology studies and ablation procedures. However, the present invention can be used to transform any solid, three-dimensional solid image data into three-dimensional surface data.

Other features, details, utilities, and advantages of the present invention will be apparent from the following more particular written description of various embodiments of the invention as further illustrated in the accompanying drawings and defined in the appended claims.

DETAILED DESCRIPTION OF THE INVENTION

The present invention is directed to a method for transforming a solid, three-dimensional graphic image model into a surface rendering that closely approximates the outer surface of the three-dimensional graphic model. Such a transformation may be highly desirable when working with an image model that is a three-dimensional solid model, but only the information related to the exterior surface of the model is of interest to the user. In such cases, attempting to manipulate all of the three-dimensional information is a waste of computer processing power and further takes additional and unnecessary processing time to render the image. For example, in medical imaging processes such as MRI or CT, a solid image model is rendered by stacking the sliced images resulting from such scans. This solid, three-dimensional information generally comprises a large amount of grayscale voxel data indicating changes in tissue density or type to render a diagnostic medical image. When the only information desired is a rendering of the surface of a particular organ or tissue structure, for example, a heart chamber, the voxel data internal and external to the surface region of interest is superfluous.

Figure 1:
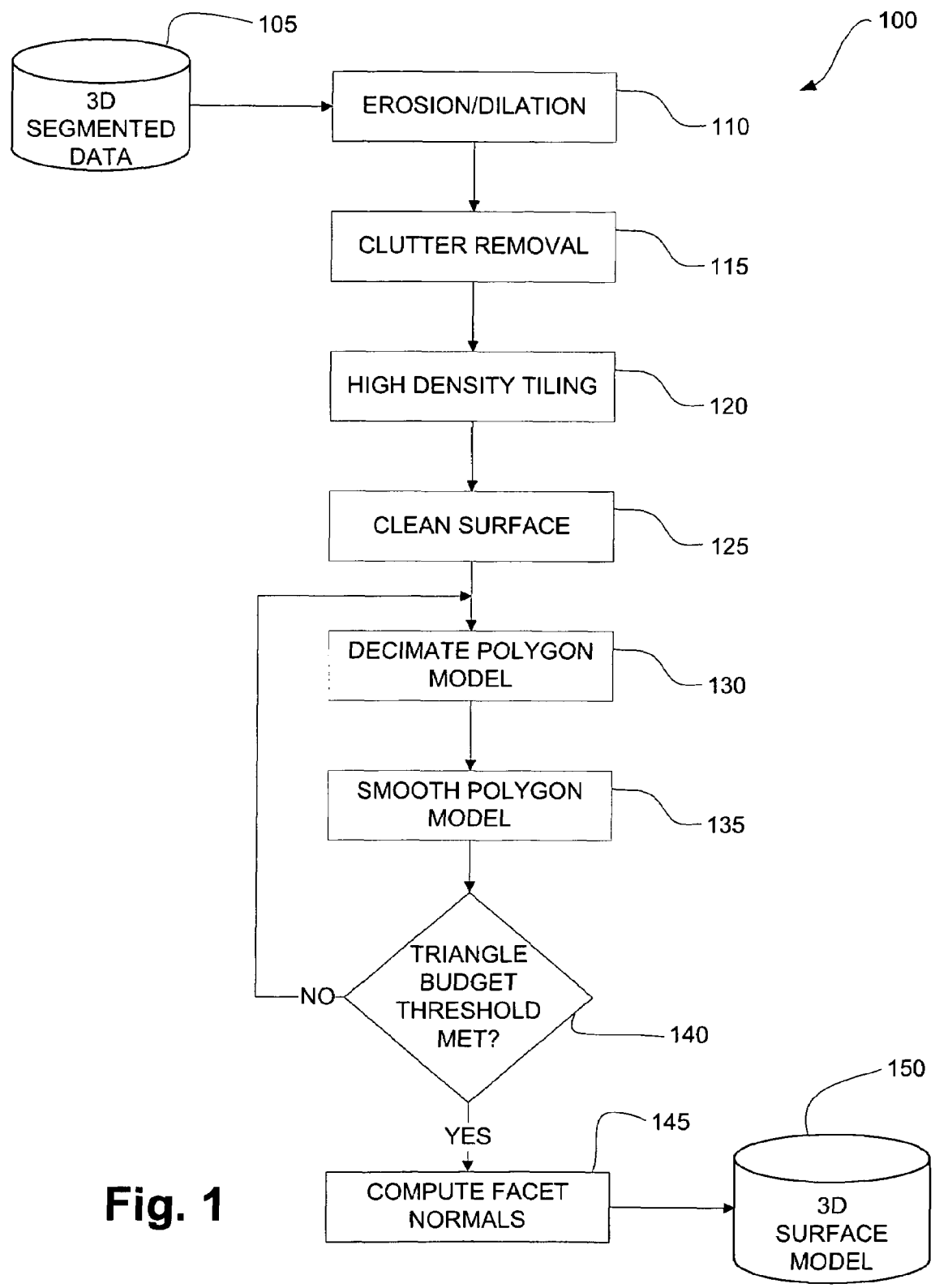
FIG. 1 is a flow diagram of a process for transforming a solid, three-dimensional image into a three-dimensional surface image according to the present invention.

FIG. 1 depicts a high-level flow chart 100 indicating a series of steps undertaken according to the present invention to transform a solid three-dimensional graphic model into a surface rendering that closely approximates the outer surface of the three-dimensional graphic model. In step 105, the three-dimensional graphic model, which may be a segmented model of an anatomical scan file, for example, an MRI image or a CT image, is accessed and opened. A segmented model indicates that a subregion of a three-dimensional image has been digitally separated from a larger three-dimensional image, e.g., an image of the right atrium separated from the rest of the heart. Exemplary segmentation applications include ANALYZE (Mayo, Minneapolis, Minn.), Verismo (St. Jude Medical, Inc., St. Paul, Minn.), and CardEP (General Electric Medical Systems, Milwaukee, Wis.). Generally such image files are composed of three-dimensional image point information. Each image point is commonly referred to as a voxel, which is a three-dimensional version of a pixel, the common unit of graphic information in a two-dimensional display environment. Each voxel therefore comprises information necessary to render the three-dimensional graphic image, in particular, positional information, color information, and shading information.

Figure 2:
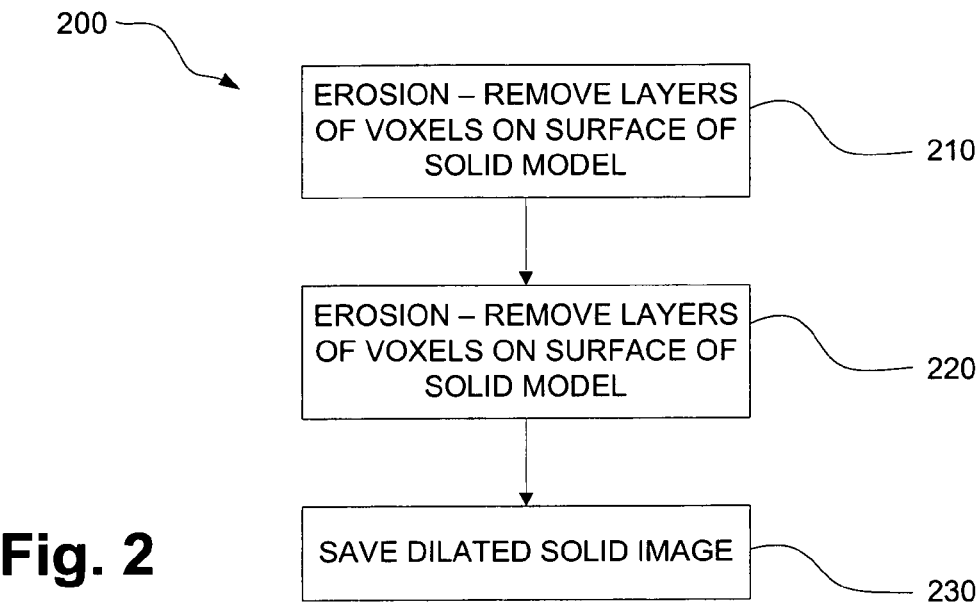
FIG. 2 is a flow diagram detailing the process of the erosion/dilation step of FIG. 1.

Once the three-dimensional graphic file is accessed, the voxels on the surface of the solid image are subject to an erosion and dilation process, step 110, which is described in greater detail with respect to FIGS. 2 and 3A-3D. The erosion and dilation process 200 of FIG. 2 is performed to simplify the three-dimensional model. The erosion and dilation process 200 is targeted to remove bridges or other narrow voxel structures that may be extraneous to the desired three-dimensional image or that otherwise unnecessarily complicate the three-dimensional image. In step 210, one or more layers of voxels on the surface of the solid model are eroded or removed. The number of layers to be removed is set as a threshold variable and can be changed by the user depending upon the desired result. Operating from the presumption that a narrow string of voxels is likely not part of the desired surface image, setting the threshold to remove groups of voxels of less than a certain number in width will remove or erode such groups or chains.

Figure 3A:
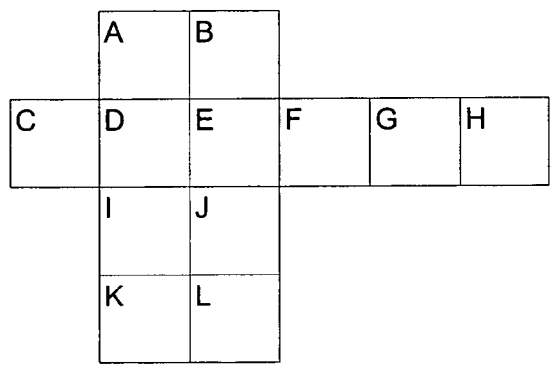
FIGS. 3A-3D are schematic diagrams representing the actions of the erosion/dilation process of FIG. 2 on variously-sized voxel groupings.
Figure 3B:
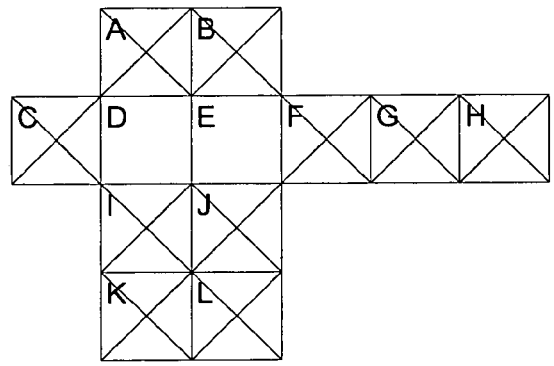
Figure 3C:
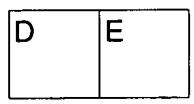
Figure 3D:
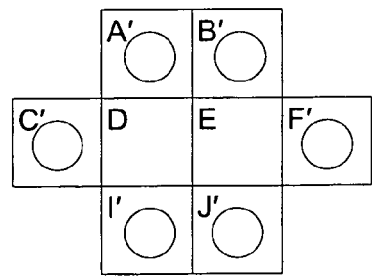
Figure 4:
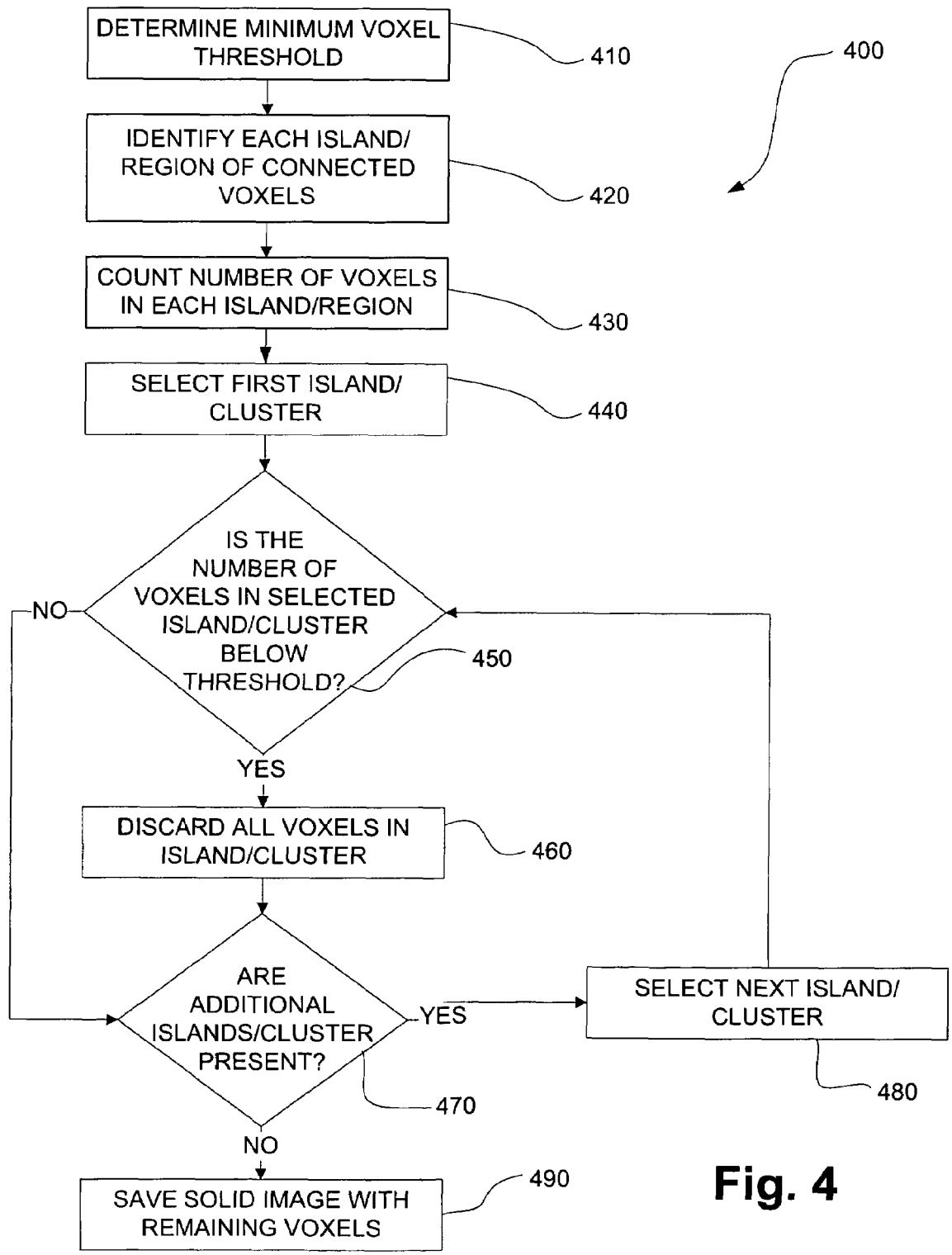
FIG. 4 is a flow diagram detailing the process of the clutter removal step of FIG. 1.

FIGS. 3A-3C schematically depict the effect of the erosion step 210. As shown in FIG. 3A, a grouping of voxels labeled A-L is subject to the erosion process. Note that while the group of voxels A-L in FIG. 3A are represented in a two-dimensional form for ease of presentation, in actuality the process is operating on three-dimensional voxels on the surface of a solid graphic model. For example, with the threshold erosion value set to one, the erosion process 210 will remove all voxels, except D and E. The voxels A, B, C, F, G, H, I, J, K, L subject to erosion are crossed out in FIG. 3B. This should be apparent because only voxels D and E are surrounded on all sides by adjacent voxels.

Once the surface of the solid graphic model has been subject to erosion, step 210, the process next performs a dilation or rebuilding step 220. In this step, one or more layers of voxels are added back to the eroded surface. As shown in FIG. 3C, only voxels D and E are left of the original image surface. However once the dilation step 220 is performed, voxels D and E are surrounded by new voxels A', B', C', F', I', and J'. The circles in these voxels A', B', C', F', I', and J' indicate that they are newly formed as a result of the dilation process. As is apparent from FIG. 3D, the thin bridge of voxels G and H is no longer part of the solid graphic surface. Similarly, original voxels K and L have been removed and thus the resulting surface is "smoother." Once the dilation step 220 has been performed, the dilated solid image graphic is saved, step 230, for additional processing according to further steps of this invention.

Figure 5A:
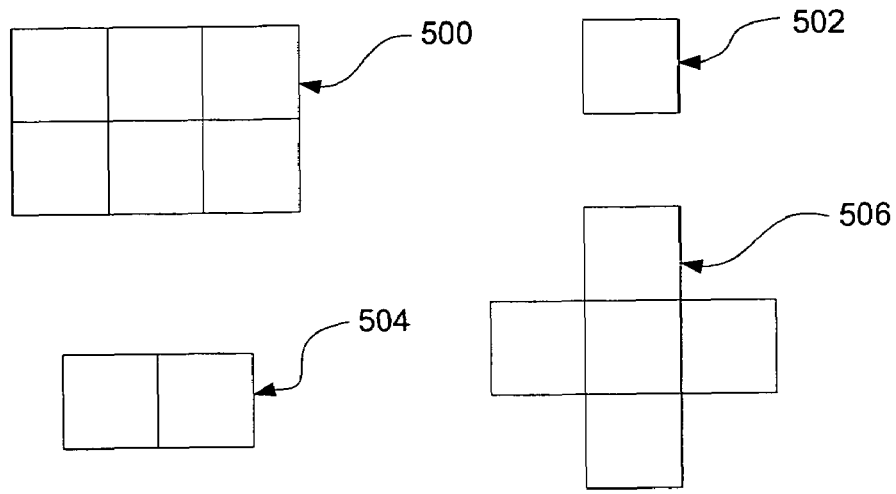
FIGS. 5A-5C are schematic diagrams representing the actions of the clutter removal process of FIG. 4 on variously sized-voxel groupings.

Returning to FIG. 1, after the erosion and dilation processes are performed, step 110, the solid graphic image is next subject to clutter removal, step 115. The process of clutter removal 400 is depicted in greater detail in FIGS. 4 and 5A-5C. The purpose of the clutter removal process 400 is to remove any small or detached voxel clusters that do not meet the size limits of the threshold values set by the user. If the number of voxels in an independent group of voxels is below the threshold, that group will be deleted as "clutter." The first step, therefore, is to determine the minimum threshold for numbers of voxels in a cluster or grouping that will be maintained as part of the image, step 410. The next step is to identify each individual island or cluster of connected voxels, step 420. For example, in FIG. 5A, four separate clusters of voxels 500, 502, 504, 506 are identified. The first cluster 500 is depicted as having six voxels; the second cluster 502 is depicted as a single voxel; the third cluster 504 is depicted as having two voxels; and the fourth cluster 506 is depicted as a grouping of five voxels.

Figure 5B:
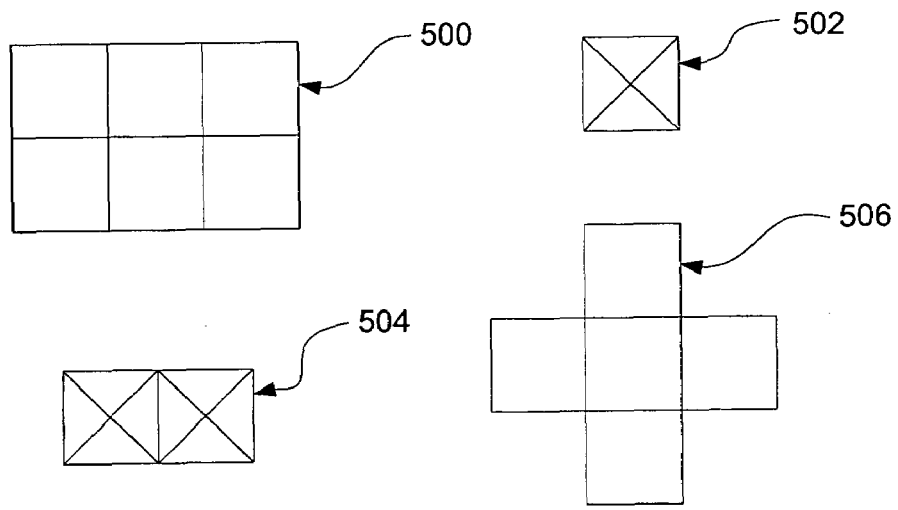
Figure 5C:
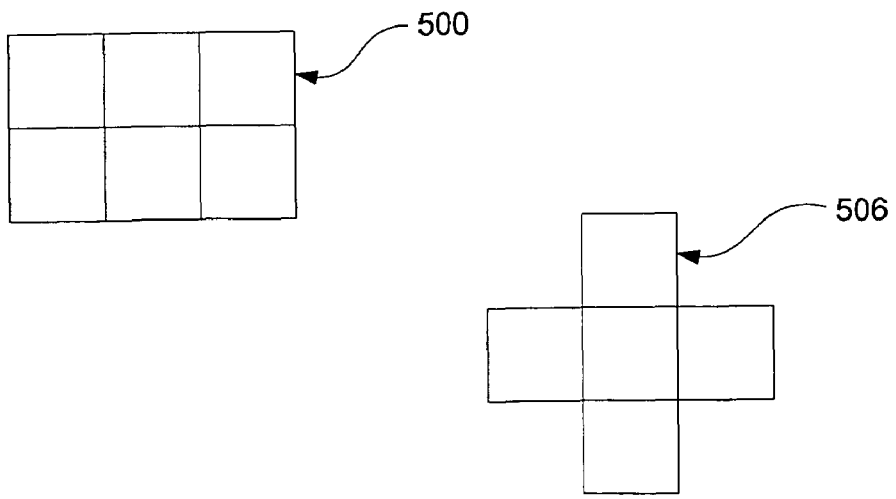

The clutter removal process 400 continues by counting the number of voxels in each individual island or cluster, step 430. A first island or cluster is selected for examination, step 440. A determination is then made whether the number of voxels in that particular island or cluster is below the threshold value previously set, step 450. If a particular cluster of voxels numbers above the threshold value, such clusters will remain part of the solid image file. If a number of voxels is below the threshold value, that particular island or cluster of voxels will be discarded from the three-dimensional graphic image, step 460. For example, as shown in FIG. 5B, when the threshold is set at two voxels, the second cluster 502 and third cluster 504 are subject to deletion from the overall image file. After a cluster is removed (step 460) or if the number of voxels in the cluster exceeds the threshold value (step 450), the process 400 continues to determine whether additional islands or clusters need to be examined, step 470. If additional voxel clusters need to be examined, the process 400 selects a new cluster on which to operate, step 480. If additional clusters of voxels require examination, the process 400 returns to step 450 to compare the voxels in each cluster to the threshold. Thus, as shown in FIG. 5C, while the second cluster 502 and third cluster 504 have been removed, the first cluster 500 and the fourth cluster 506, each with more voxels than the threshold amount, remain as part of the graphic image file. The clutter removal process ends by saving the solid image with the remaining voxel clusters that exceed the threshold, step 490.

Following the step of clutter removal 115, as indicated in FIG. 1, a high-density tiling procedure 120 may next be implemented. The primary purpose of the high-density tiling step 120 is to transform the solid graphic image into a rendering of merely the outer surface of the solid image. By creating a surface rendering, a significant amount of data and information can be discarded and thus faster processing and manipulation of the image is possible. An exemplary high density-tiling process is depicted in greater detail in FIG. 6. This exemplary process is described in great detail in U.S. Pat. No. 4,710,876, which is hereby incorporated herein by reference in its entirety.

Figure 6:
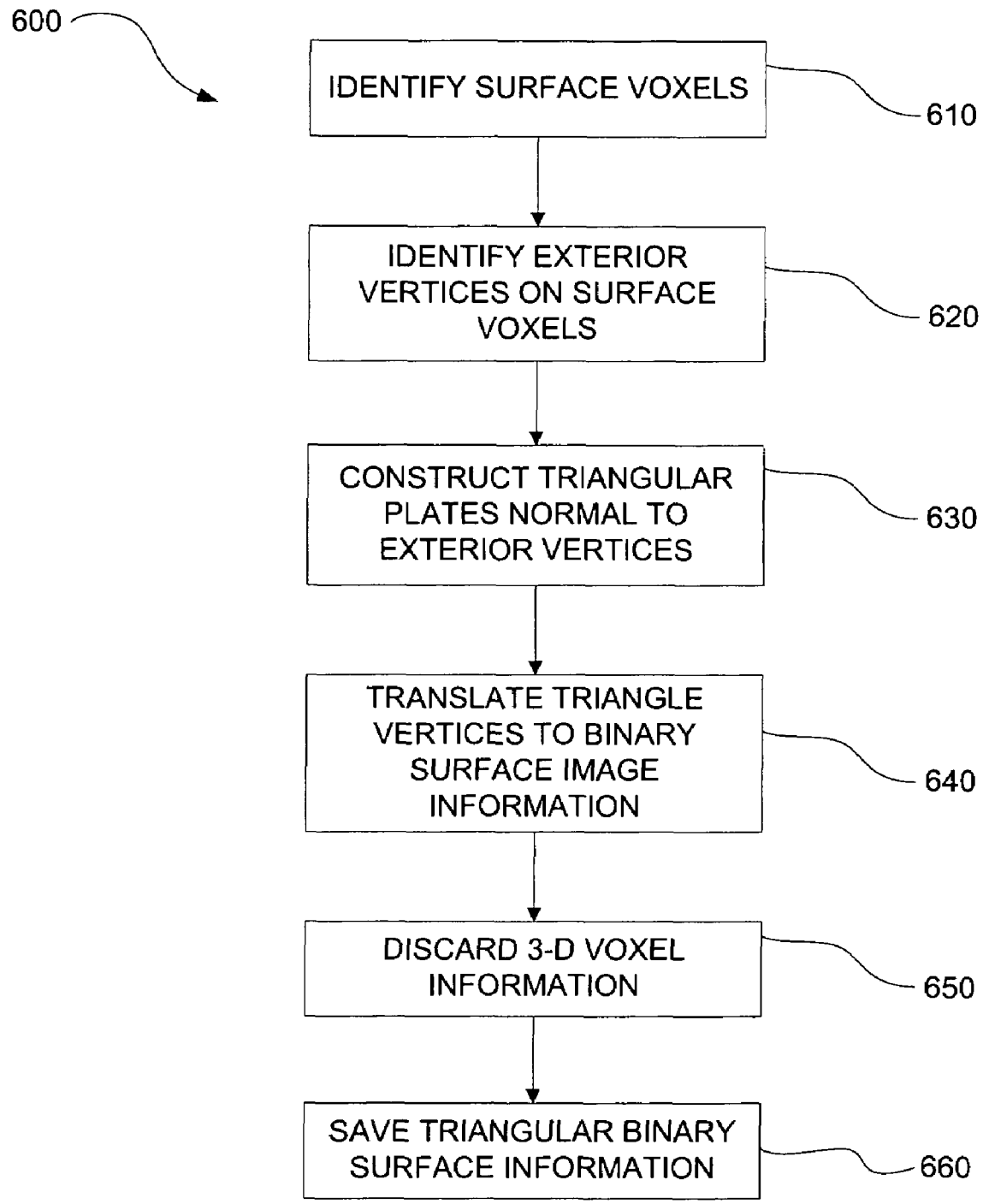
FIG. 6 is a flow diagram detailing the process of the high-density tiling step of FIG. 1.
Figure 7:
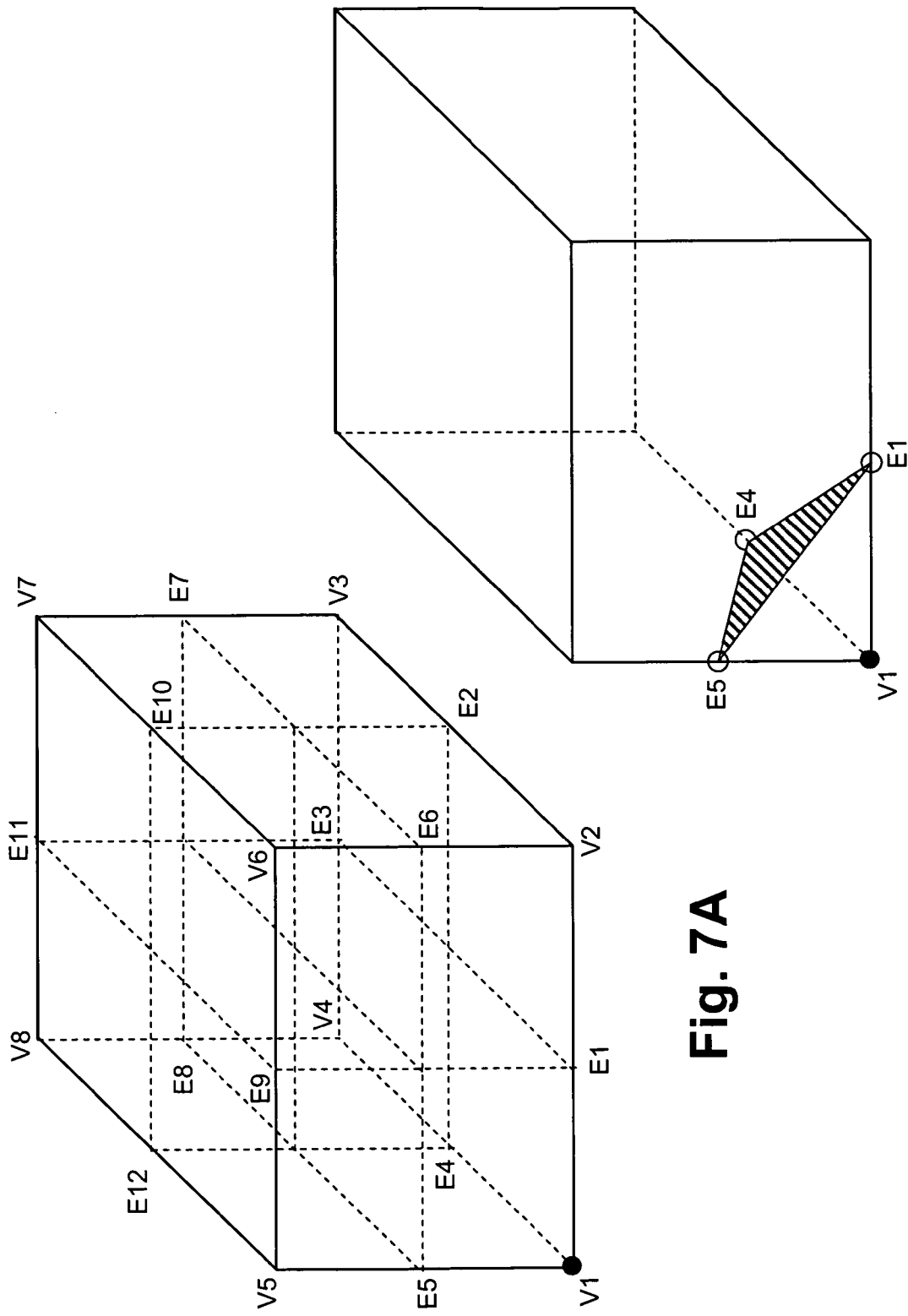
FIGS. 7A-7B are schematic diagrams representing the effect of the high-density tiling process of FIG. 6 in transforming voxels into planar triangular plates to form a three-dimensional surface image.

For the purposes of the present discussion, a high-level review of the high-density tiling process 600 is presented in conjunction with FIGS. 6 and 7A-7B. Initially, the surface voxels of the solid image are identified, step 610. Next with respect to each surface voxel, each exposed vertex is further identified, step 620. For example, in FIG. 7A, a single voxel is depicted with eight vertices labeled V1-V8. For the purposes of the present discussion, vertex V1 is identified as a sole exterior vertex. In practice this means that each of the other vertices is adjacent to a vertex on another voxel. Each voxel can further be viewed as having twelve edges that extend between each of the vertices V1-V8. In FIG. 7A, each of the edges is labeled E1-E12. Excluding the dashed lines connecting vertices V1 and V4, V3 and V4, and V4 and V8, the dashed lines in FIG. 7A connect the midpoints of each of the edges and generally divide the voxel into four quadrants.

With this background, the next step of high-density tiling process 600 is to construct triangular plates normal to the exterior or exposed vertices, step 630. This concept is depicted in FIG. 7B. As shown in FIG. 7B, a triangular plate is constructed between the midpoints of each of the edges E1, E4, and E5, common to the exterior vertex V1. As can be seen in FIG. 7B, this triangular plate is normal to the vertex V1. When more than one vertex of a voxel is an exterior vertex, this concept of triangular plate construction is extrapolated to construct a collection of triangular plates that are normal to each of the exterior vertices. Once the triangular plates have been constructed for each of the exterior vertices of the surface voxels, the vertices of each of the triangular plates identified by respective edge midpoints of the voxels are translated into binary surface image information, step 640. Once the triangular plates are represented in binary form, the three-dimensional voxel information for both the surface voxels as well as the interior voxels of the solid image are discarded, step 650. The binary surface information of the collection of triangular plates corresponding to the surface of the original solid image is then saved, step 660.

Figure 8:
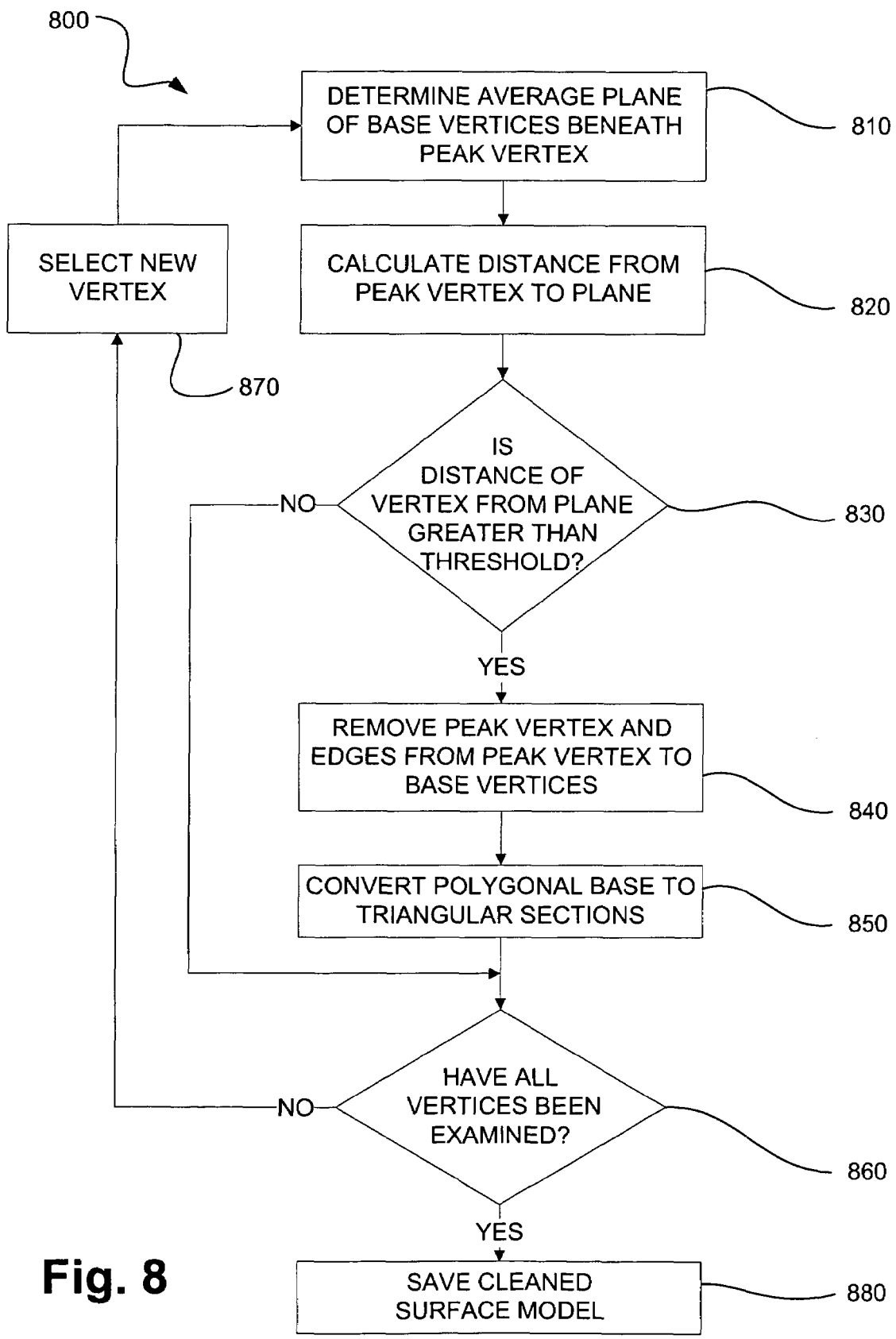
FIG. 8 is a flow diagram detailing the process of the surface cleaning step of FIG. 1.

Once a solid graphic image has been transformed into a surface model via the high-density tiling step 120 as indicated in FIG. 1, the next step in the process is to clean the surface, step 125. The purpose of cleaning the surface is to search for and remove any objects that are not substantially co-planar with the surrounding surface. The process of cleaning the surface is described in greater detail with respect to FIGS. 8 and 9A-9B. The surface image formed of the triangular plates may be visualized as a surface "mesh" with areas of relative planarity populated by polyhedron structures that extend above adjacent areas.

The surface cleaning process 800 begins by determining an average plane of the base vertices of any polyhedron with a peak vertex above and connected along edges to the base vertices, step 810. The distance from each peak vertex to the average plane previously determined in step 810 is then calculated, step 820. A determination is then made as to whether the distance of the peak vertex from the average base is greater than a threshold value, step 830. Generally, this threshold value will be chosen by the user to identify substantial aberrations protruding from areas of otherwise smooth surface configurations. If the separation distance of the peak vertex extends above the threshold value, the peak vertex and any edges connecting the peak vertex to the base vertices are removed from the surface mesh, step 840. Once the peak vertex is removed, any polygonal base areas remaining after removal of the peak vertex are converted to triangular sections, step 850. If the distance from the peak vertex to the local plane is below the threshold, then the surface cleaning process 800 skips from step 830 to step 860. The process 800 queries whether all vertices have been examined, step 860. If not, then the process 800 selects a new vertex for examination, step 870 and returns to step 810 to compute the average plane around the new vertex and complete the other steps in the process 800. After the final base area is triangulated, the clean surface model is then saved for use in further processing steps, step 880.

Figure 9A:
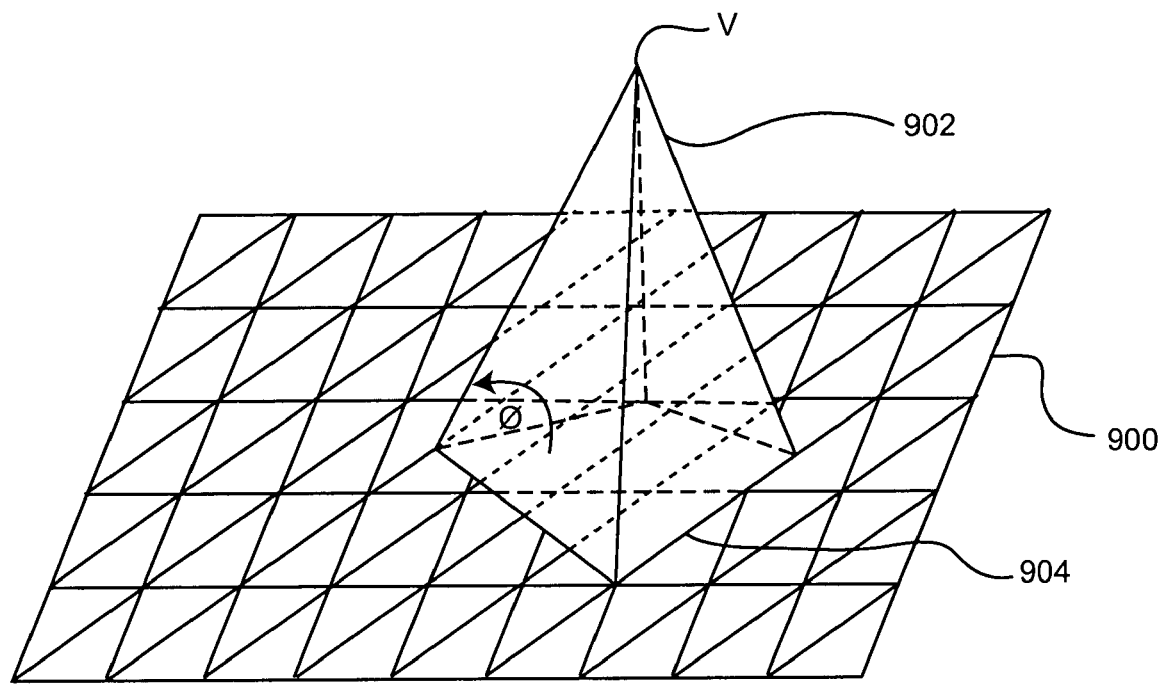
FIGS. 9A-9B are schematic diagrams representing the effect of the surface cleaning process of FIG. 8 on the three-dimensional surface image.
Figure 9B:
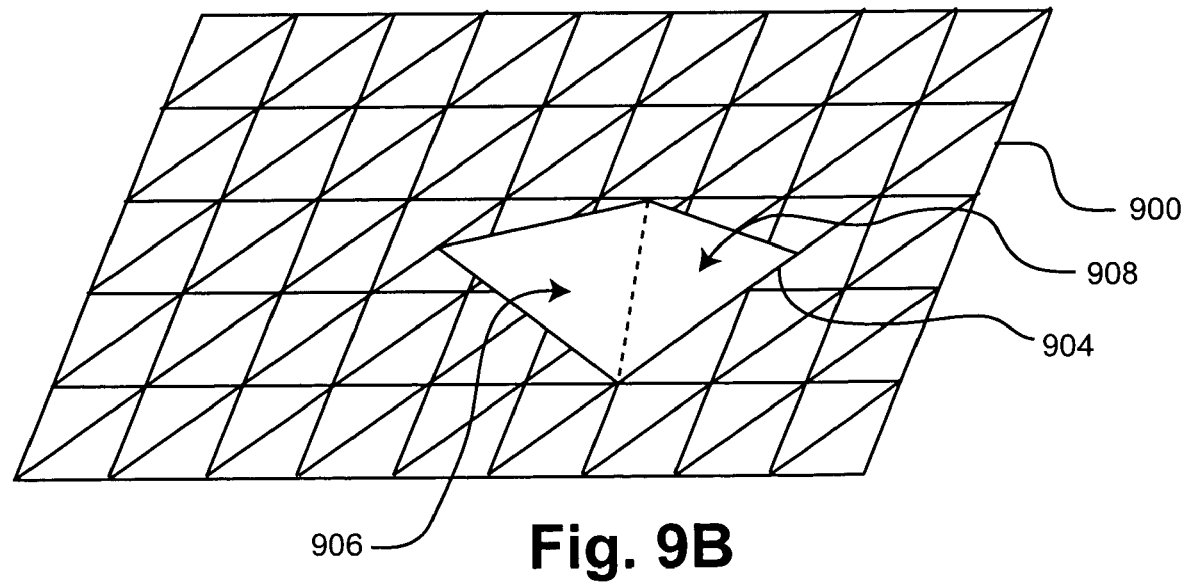

FIGS. 9A and 9B are exemplary depictions of the surface cleaning process 800. In FIG. 9A, a sharp polyhedron 902 with a base 904 extends above an otherwise generally planar surface area 900. Pursuant to the surface cleaning process 800, the peak vertex V of the polyhedron 902 is removed as are the edges connecting the peak vertex V to the vertices of the base 904. In FIG. 9B, the peak vertex V and the edges connecting it with the base 904 have been removed. Only the base 904 remains as a hole or open area on the planar area 900 in FIG. 9B. However, the base 904 is a non-triangular polygon and does not conform to the binary dataset desired for representing the three-dimensional surface. Therefore, the base 904 of the former polyhedron 902 is be appropriately re-triangulated into two triangular sections 906, 908 as shown in FIG. 9B.

Returning to FIG. 1, after the surface has been cleaned in step 125, the polygonal surface model is decimated, step 130. The major purpose of decimation is to reduce the amount of information used to describe the three-dimensional surface. The high-density tiling algorithm of step 120 generally creates surfaces composed of 100,000 or more triangles. The data associated with locating and orienting such a large number of surface triangles creates high demand on processing power of a computer system manipulating the surface model. Therefore, it is desirable to attempt to remove a significant number of the triangles forming the surface of the image. Typically, a reduction to around 15,000 triangles representing the image surface reduces the corresponding data to a manageable amount.

Figure 10:
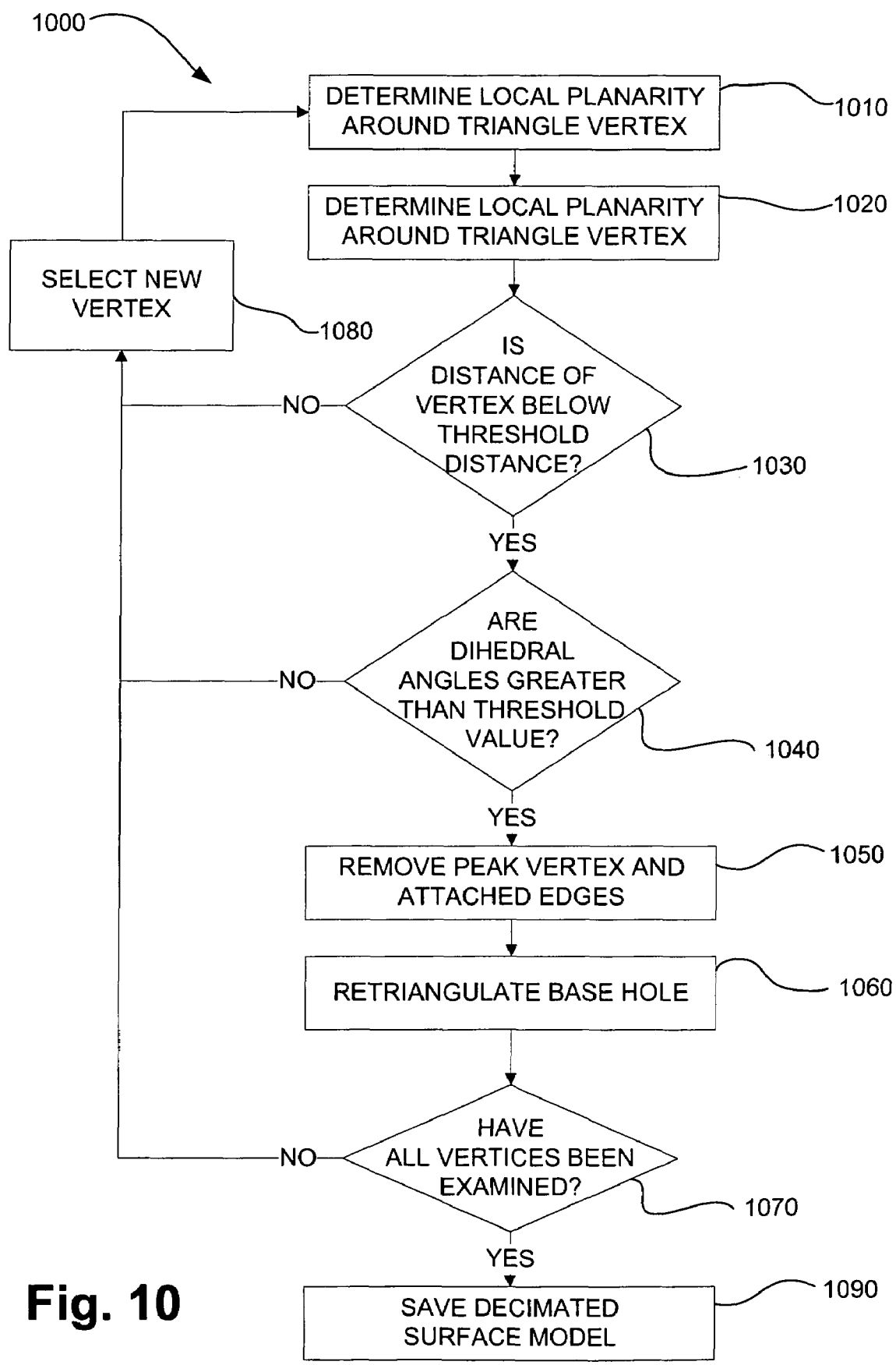
FIG. 10 is a flow diagram detailing the process of the decimation step of FIG. 1.
Figure 11A:
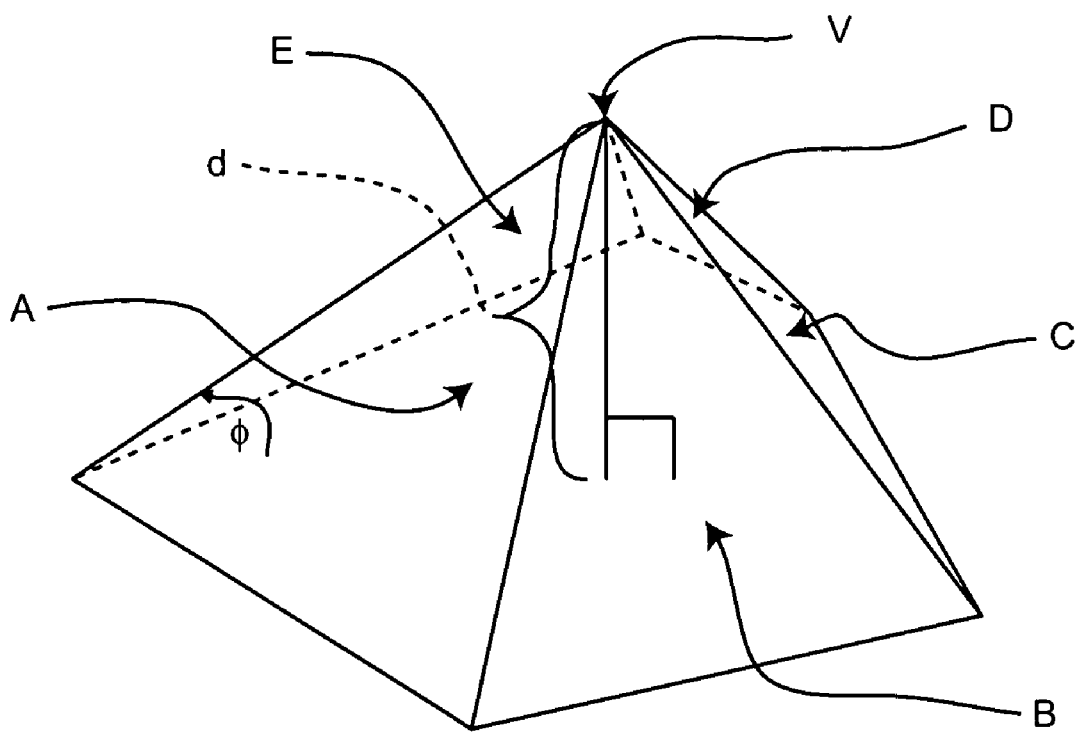
FIGS. 11A-11B are schematic diagrams representing the effect of the decimation process of FIG. 10 on the three-dimensional surface image.
Figure 11B:
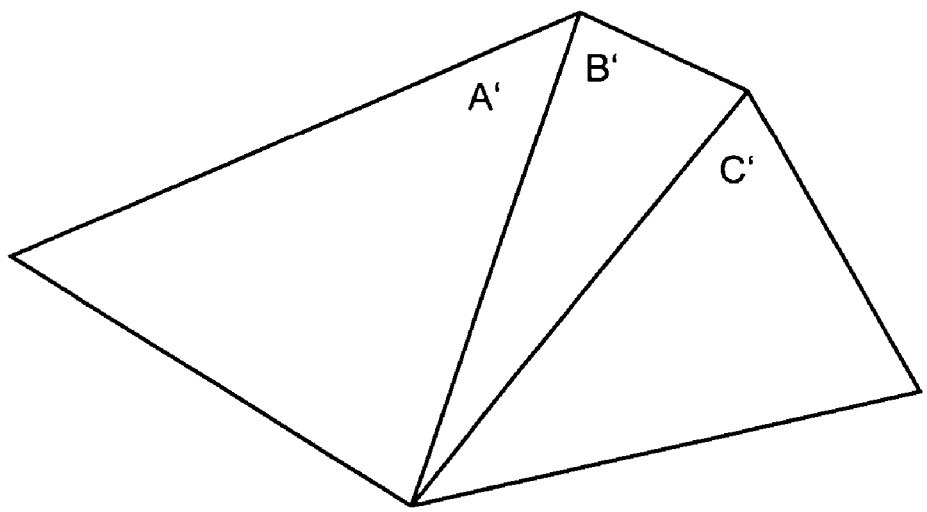

FIG. 10 depicts in greater detail the steps involved in a decimation process 1000 of a polygonal model. FIGS. 11A and 11B provide graphic representations of what effect such a process has on the surface image. The decimation procedure 1000 is actually similar in some respects to the surface cleaning procedure 800 previously described with respect to FIG. 8. As before, the local average plane around a polyhedron peak vertex is determined, step 1010. A distance of this peak vertex from the local plane is then measured, step 1020. The process then queries whether the distance of the peak vertex from the local plane is below a threshold distance, step 1030. If the peak vertex is not below the threshold distance, the process continues to select a new peak vertex to undertake similar calculations, step 1080. If the peak vertex separation distance is below the threshold distance, the process further queries whether the dihedral angles of the polygon formed by the peak vertex are greater than a threshold value. The larger the dihedral angles, the flatter the polyhedron formed by the peak vertex will be. This indicates that the polyhedron formed by the peak vertex is very low to the surrounding local planar surface and thus the polyhedron is a good candidate for decimation. If the dihedral angles are not above the threshold value, the process continues to select a new peak vertex to undertake similar calculations, step 1080.

In the event that the conditions in steps 1030 and 1040 are met, the peak vertex and the attached edges are removed from the surface model, step 1050. As before in the decimation process 800, the remaining polygonal base is re-triangulated, step 1060, in order to transform any odd polygonal-shaped area into a collection of triangles. The decimation process 1000 then queries whether all potential peak vertices on the surface model have been examined, step 1070. If not, the decimation process 1000 continues to repeat to examine all peak vertices and determine whether they meet criteria for decimation. Once the decimation process 1000 has examined all the peak vertices on the surface model, the decimated surface model is saved for further processing, step 1090.

The results of the decimation process 1000 are seen through comparison of FIGS. 11A and 11B. In FIG. 11A, a polyhedron with a peak vertex V is composed of five facets labeled A-E. In this instance, the height d of the peak vertex falls under the threshold limit, the polyhedral angles Ø exceed the threshold limit, and therefore the polyhedron is subject to decimation. In FIG. 11B, the peak vertex V and adjacent edges have been removed and the remaining polygonal foot print has been re-triangulated to create a surface composed of three triangles A', B', and C' instead of the prior polyhedral surface composed of five triangles A-E. Thus, it becomes apparent that by pursuing the decimation process 1000, the amount of data necessary to describe the surface model is reduced.

Figure 12:
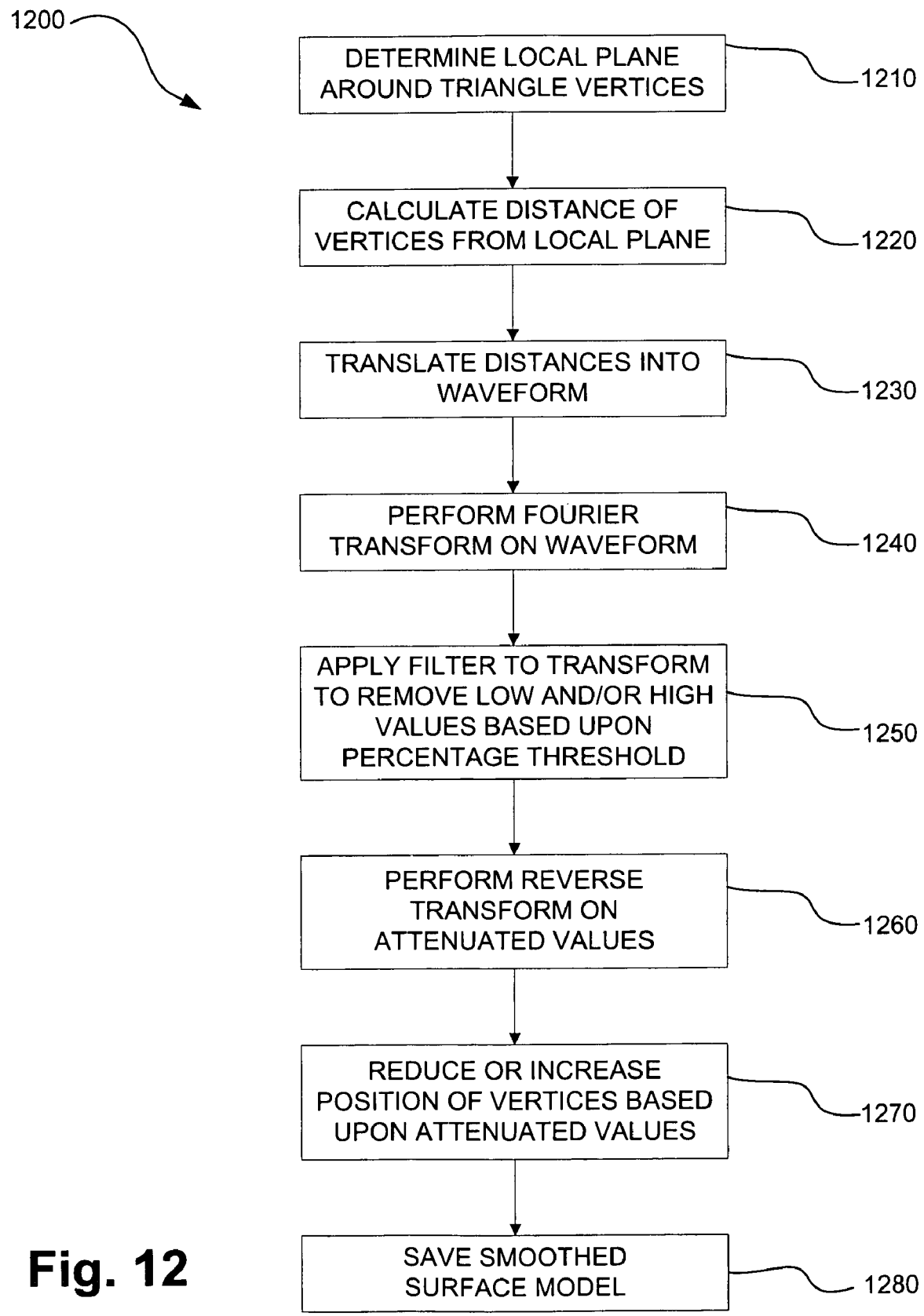
FIG. 12 is a flow diagram detailing the process of the surface smoothing step of FIG. 1.
Figure 13A:
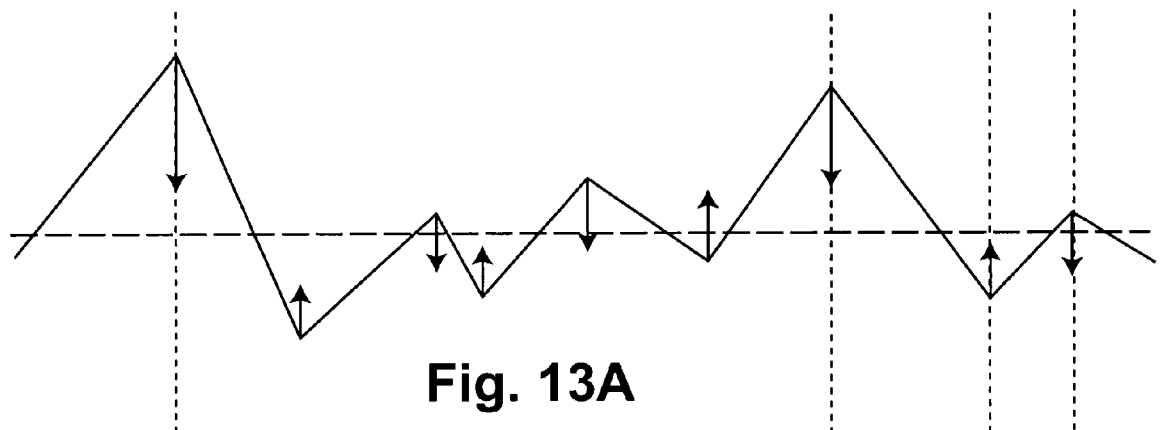
FIGS. 13A-13C are schematic diagrams representing the actions and effect of the smoothing process of FIG. 12 on the three-dimensional surface image.

Again returning to FIG. 1, after decimation step has been performed, step 130, the surface image model may be smoothed via an associated smoothing process, step 135. An exemplary smoothing process 1200 is presented in greater detail in FIG. 12. The smoothing process 1200 begins in a similar manner to the decimation process 1000, The local plane around each triangles' vertices are determined, step 1210, and the distance of the vertices on the surface model from respective local planes are calculated, step 1220. However, in the smoothing process 1200, an entirely different methodology is performed. In the smoothing process 1200, the distances of the vertices from their respective local planes are translated into a waveform, step 1230. An exemplary wave form is depicted in FIG. 13A. The peaks in the wave form in FIG. 13A represent the relative distance of adjacent peak vertices from surrounding base vertices.

Figure 13C:
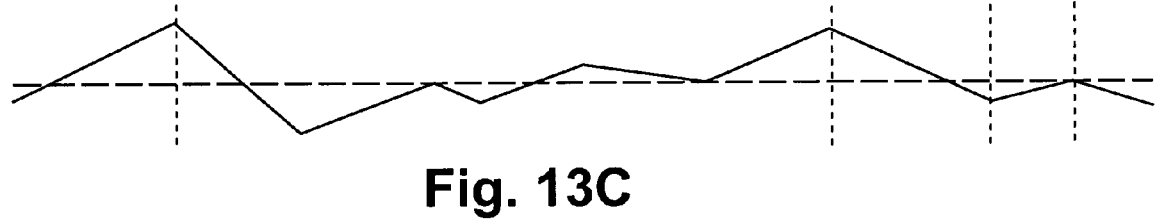
Figure 13B:
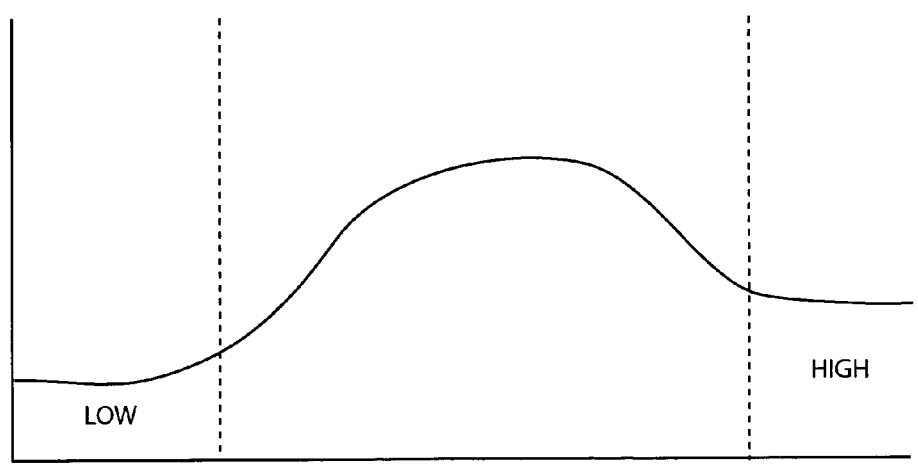

In the next step of the smoothing process 1200, a Fourier transform is performed on the waveform, step 1240, whereby the domain of the waveform is changed to an amplitude domain. The amplitude domain is depicted as a curve in FIG. 13B which represents the number of peak vertices plotted against their respective height or distance from the local plane. For example in FIG. 13A, most of the peak vertices may have a separation distance that falls within a medium height. In the next step of the smoothing process 1200, a filter is applied to the transform to remove low and high values based upon a range or percentage threshold of amplitude values to retain set by the user, step 1250. This filtering is represented in FIG. 13B by the vertical lines that separate the middle values from the values marked high and low. Once the filter has been applied in step 1250, a reverse Fourier transform is performed on the attenuated values in the amplitude domain waveform, step 1260. The separation distance of the peak vertices from the local plane is thereby reduced due to attenuation of high height vertices, step 1270. Further, the attenuation also affects any low lying vertices and thereby raises the local plane in those areas. The relative raising and lowing of vertices is represented by the arrows in FIG. 13A. A final surface resulting from the smoothing process 1200 is represented in FIG. 13C, wherein the result is a shorter separation distance between peak vertices and the local plane. Common vertices between FIGS. 13A and 13C are indicated by the exemplary dashed lines spanning between FIGS. 13A and 13B for several of such vertices. The smoothing process 1200 terminates by saving the smooth surface model, step 1280.

The next step of the surface rendering process is again presented in FIG. 1. Recalling that the goal is to reduce the amount of data needed to represent the surface model, the process queries whether the triangle budget has been met, step 140, via the decimation step 130 and the smoothing step 135. As previously noted, an exemplary goal for the reduction of triangle facets from the surface model may be to reduce over 100,000 triangles to under 15,000 triangles to represent the surface image model. If the desired triangle reduction level has not been met, the process returns from step 140 to perform the decimation process in step 130 and further the smoothing process in step 135 until the triangle budget of step 140 is ultimately met. It should be noted that by performing the smoothing process of step 135, the separation distances between any peak vertices of polyhedrons protruding from the surface model and their local plane are regularly reduced. By reducing this separation distance, greater numbers of peak vertices become eligible for decimation pursuant to step 1030 of FIG. 10 as the separation distances of more peak vertices now fall below the threshold distance. Therefore, by repeatedly performing the decimation step 130 and the smoothing step 135, the triangle budget of step 135 can ultimately be met. It should be further noted that the order of performing the decimation step 130 and the smoothing step 135 is not important and can be reversed.

Figure 14:
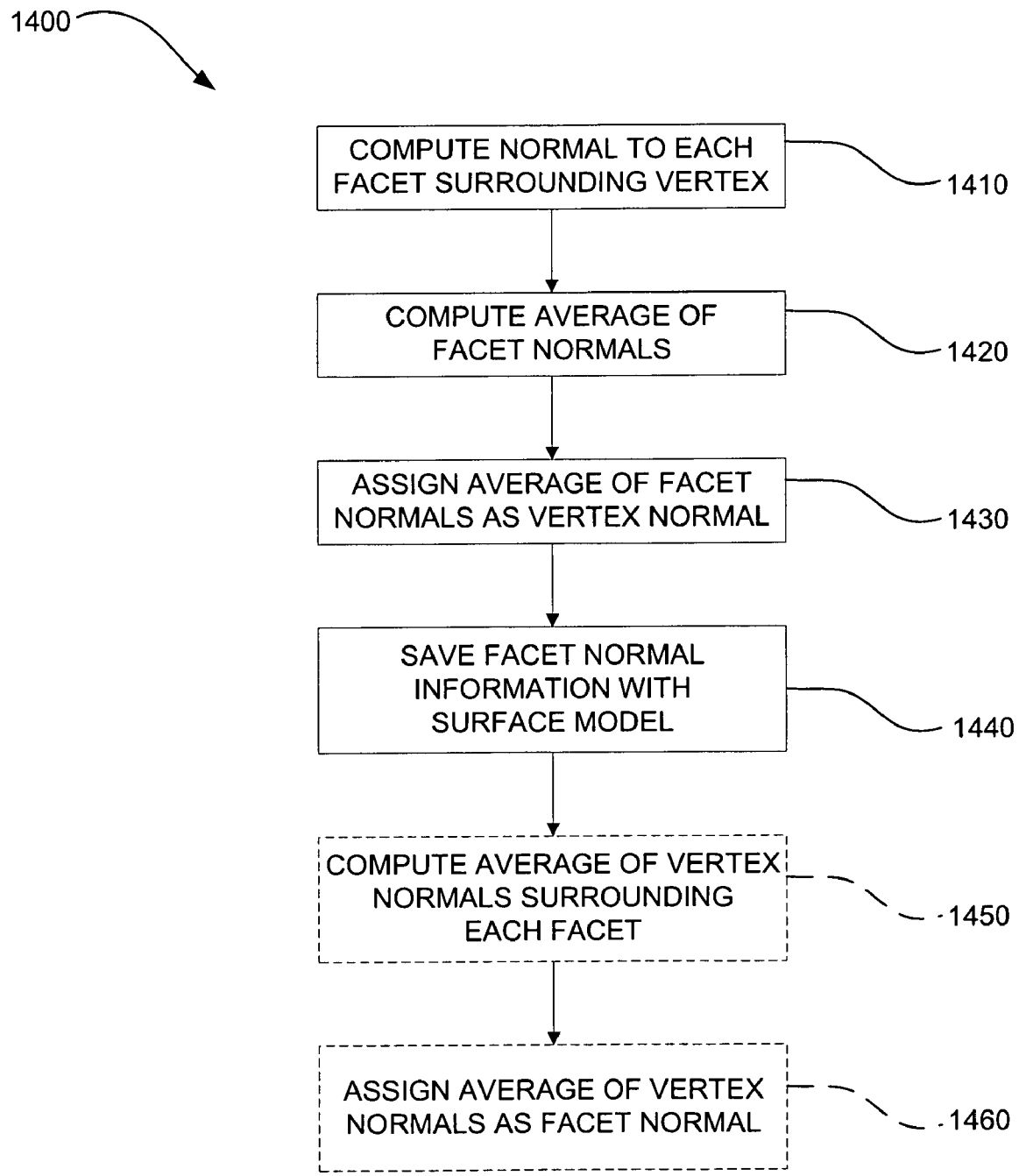
FIG. 14 is a flow diagram detailing the process of the facet normal computation step of FIG. 1.

Once the triangle budget of step 140 is achieved, the process computes facet normals (i.e., a unit vector indicating the direction perpendicular to the face of a triangle plate) for each of the remaining triangles forming the surface model, step 145. Steps involved in computing facet normals are indicated in greater detail in FIG. 14. The facet normal computing process 1400 is a relatively standard process in creating surface image renderings. Facet normal data are used by graphic rendering programs to indicate appropriate shading for a particular facet based upon the relative location of an artificial light source. The facet normals are used to further compute vertex normals for each vertex of each triangular plate forming the three-dimensional surface model. The vertex normal information is saved with the surface image information for later graphic rendering. First, the normal to each facet or triangular plate in the surface image is computed, step 1410. Next, the facet normals for facets surrounding a particular vertex are averaged together, step 1420. The average of the facet normals surrounding the particular vertex is assigned to or identified with the particular vertex, step 1430 and saved with the surface model information, step 1440.

For the purposes of the process 100, the facet normal process 1400 is complete at step 1440. However, a discussion of some of the general steps performed later by an exemplary graphic rendering program is helpful to understanding the rational for creating and storing vertex normal information. When determining shading for the application of grayscale or color to the surface image, many graphic rendering programs seek vertex normal information. The average of the normal values for the three vertices surrounding a facet is computed for each triangular facet of the surface image, step 1450, and then this average value for the vertex normals is reassigned to a respective facet as the facet normal, step 1460. The boxes for these steps are shown in phantom in FIG. 14 because technically, they are not part of the surface image rendering process 100. By averaging the normal vector information twice, a significantly more uniform surface image, especially with respect to grayscale or color shadings applied to the surface under a point light source, is achievable.

Figure 15A:
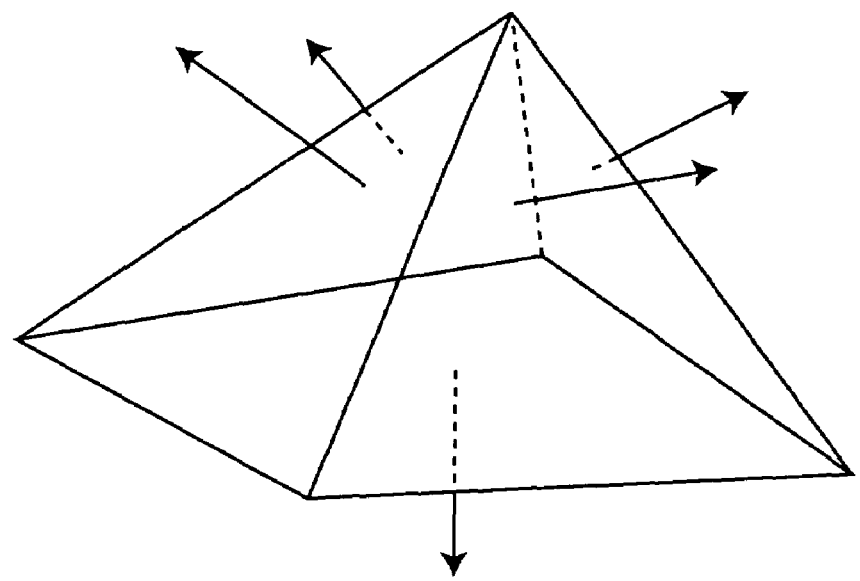
FIGS. 15A-15B are schematic diagrams representing the effect of the facet normal computation process of FIG. 14 on the three-dimensional surface image.
Figure 15B:
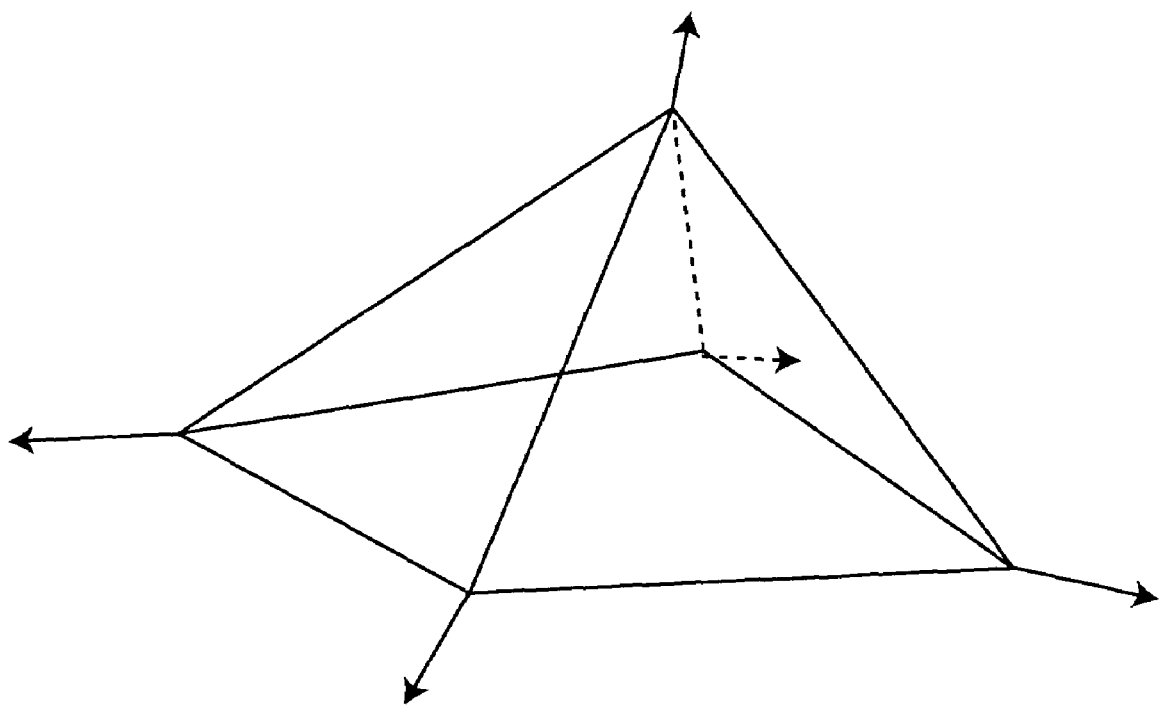

The benefit of this process is illustrated in FIGS. 15A and 15B. In FIG. 15A, a polyhedron with a peak vertex has several facets that would reflect light from a light source in a graphic surface rendering program in completely different directions as indicated by the arrows. Because of this difference in reflection direction, the gray scale applied to the facets of the polyhedron will be non-uniform and will further likely reflect the light source in completely different directions than a surrounding smoother surface area. However, by computing the vertex normals (see FIG. 15B), and then averaging the vertex normals for each triangular facet, the reflection direction for any gray scale application will be more coherent across the surfaces of the polyhedron. Once the facet normals and vertex normals are computed, the process outlined in FIG. 1 terminates by saving the completed three-dimensional surface model in a format for later use, step 150.

Although various embodiments of this invention have been described above with a certain degree of particularity, or with reference to one or more individual embodiments, those skilled in the art could make numerous alterations to the disclosed embodiments without departing from the spirit or scope of this invention. All directional references (e.g., proximal, distal, upper, lower, upward, downward, left, right, lateral, front, back, top, bottom, above, below, vertical, horizontal, clockwise, and counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the basic elements of the invention as defined in the following claims.

What is claimed is:

1. A method for transforming a solid, three-dimensional image composed of voxels into a three-dimensional surface rendering, the method comprising eroding voxels on a surface of the solid, three-dimensional image to a first predetermined threshold;

dilating the surface of the solid, three-dimensional image by adding voxels to the surface about any non-eroded surface voxels to a second predetermined threshold;

removing groups of contiguous voxels numbering under a third predetermined threshold;

translating data identifying all surface voxels into data representing a plurality of correlated triangular plates to render an initial three-dimensional surface image;

discarding the data identifying all the voxels forming the solid, three-dimensional image;

cleaning the initial three-dimensional surface image by removing a polyhedral structure formed by a group of the plurality of triangular plates;

decimating the initial three-dimensional surface image by reducing in number the plurality of triangular plates forming the initial three-dimensional surface image; and smoothing the initial three-dimensional surface rendering by reducing an initial distance between a peak vertex of a polyhedral structure formed by a group of the plurality of triangular plates from a local plane.

2. The method of claim 1, wherein the step of cleaning further comprises removing a peak vertex and corresponding edges of any polyhedral structure formed by a group of the triangular plates in which a distance of the peak vertex from a local plane is greater than a fourth predetermined threshold.

3. The method of claim 2 further comprising re-triangulating a base polygonal area created by the removal of the peak vertex and corresponding edges of the polyhedral structure.

4. The method of claim 1, wherein the step of decimating further comprises removing a peak vertex and corresponding edges of any polyhedral structure formed by a group of the triangular plates in which a distance of the peak vertex from a local plane is less than a fifth predetermined threshold.

5. The method of claim 4 further comprising re-triangulating a base polygonal area created by the removal of the peak vertex and corresponding edges of the polyhedral structure.

6. The method of claim 1, wherein the step of decimating further comprises removing a peak vertex and corresponding edges of any polyhedral structure formed by a group of the triangular plates in which a polyhedral angle of at least one of the corresponding edges of the polyhedral structure is greater than a sixth predetermined threshold.

7. The method of claim 6 further comprising re-triangulating a base polygonal area created by the removal of the peak vertex and corresponding edges of the polyhedral structure.

8. The method of claim 1, wherein the step of smoothing further comprises translating the initial distance;

applying a Fourier transform to the waveform to create an amplitude domain waveform;

filtering the amplitude domain waveform to attenuate at least one of low and high ranges of the distance between the peak vertex and the local plane;

applying a reverse Fourier transform to translate the attenuated amplitude domain waveform into second waveform; and translating the second waveform into a reduced distance between the peak vertex and the local plane into a first waveform.

9. The method of claim 1 further comprising repeating the steps of decimating and smoothing until a seventh predetermined threshold of remaining triangular plates is reached.

10. The method of claim 9, wherein in the event the seventh predetermined threshold is unable to be met, the method further comprises repeating the steps of claim 1 and 11 at a first revised threshold, a second revised threshold, and/or a third revised threshold until the seventh predetermined threshold of remaining triangular plates is reached.

11. The method of claim 1 further comprising repeating the steps of cleaning, decimating, and smoothing until a seventh predetermined threshold of remaining triangular plates is reached.

12. The method of claim 11, wherein in the event the seventh predetermined threshold is unable to be met, the method further comprises repeating the steps of claim 1 and 11 at a first revised predetermined threshold, a second revised predetermined threshold, and/or a third revised predetermined threshold until the seventh predetermined threshold of remaining triangular plates is reached.

13. The method of claim 1 further comprising computing facet normals for each triangular facet forming the three-dimensional surface image.

14. The method of claim 13, wherein the step of computing facet normals further comprises computing a vertex normal value for each vertex of a facet by averaging the facet normals of each triangular plate common to the vertex;

computing an average of vertex normal values of each vertex of a particular facet; and substituting the average of the vertex normal values for the facet normals of each of the triangular plates.

15. A computer-readable medium having computer-executable instructions for performing steps comprising eroding voxels on a surface of a solid, three-dimensional image to a first predetermined threshold;

dilating the surface of the solid, three-dimensional image by adding voxels to the surface about any non-eroded surface voxels to a second predetermined threshold;

removing groups of contiguous voxels numbering under a third predetermined threshold;

translating data identifying all surface voxels into data representing a plurality of correlated triangular plates to render an initial three-dimensional surface image;

discarding the data identifying all the voxels forming the solid, three-dimensional image;

cleaning the initial three-dimensional surface image by removing a polyhedral structure formed by a group of the plurality of triangular plates;

decimating the initial three-dimensional surface image by reducing in number the plurality of triangular plates forming the initial three-dimensional surface image; and smoothing the initial three-dimensional surface rendering by reducing an initial distance between a peak vertex of a polyhedral structure formed by a group of the plurality of triangular plates from a local plane.

16. The computer readable medium of claim 15, wherein the computer executable instructions for performing the step of cleaning further comprises removing a peak vertex and corresponding edges of any polyhedral structure formed by a group of the triangular plates in which a distance of the peak vertex from a local plane is greater than a fourth predetermined threshold.

17. The computer readable medium of claim 15, wherein the computer executable instructions for performing the step of decimating further comprises removing a peak vertex and corresponding edges of any polyhedral structure formed by a group of the triangular plates in which a distance of the peak vertex from a local plane is less than a fifth predetermined threshold.

18. The computer readable medium of claim 15, wherein the computer executable instructions for performing the step of decimating further comprises removing a peak vertex and corresponding edges of any polyhedral structure formed by a group of the triangular plates in which a polyhedral angle of at least one of the corresponding edges of the polyhedral structure is greater than a sixth predetermined threshold.

19. The computer readable medium of claim 15, wherein the computer executable instructions for performing the step of smoothing further comprises translating the initial distance;

applying a Fourier transform to the waveform to create an amplitude domain waveform;

filtering the amplitude domain waveform to attenuate at least one of low and high ranges of the distance between the peak vertex and the local plane;

applying a reverse Fourier transform to translate the attenuated amplitude domain waveform into second waveform; and translating the second waveform into a reduced distance between the peak vertex and the local plane into a first waveform.

20. The computer readable medium of claim 15, wherein the computer executable instructions for performing the step of decimating further comprises repeating the steps of decimating and smoothing until a seventh predetermined threshold of remaining triangular plates is reached.

* * * * *